(12) United States Patent
Spägele et al.

(10) Patent No.: US 6,397,821 B1
(45) Date of Patent: Jun. 4, 2002

(54) METHOD AND DEVICE FOR CONTROLLING AN INTERNAL COMBUSTION ENGINE

(75) Inventors: Thomas Spägele, Tettnang; Armin Dölker, Immenstaad, both of (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 09/635,182

(22) Filed: Aug. 7, 2000

(30) Foreign Application Priority Data

Aug. 6, 1999 (DE) .......................... 199 37 139

(51) Int. Cl.⁷ .............................................. F02D 41/40
(52) U.S. Cl. ...................... 123/486; 123/357; 123/501
(58) Field of Search ................................. 123/357, 358, 123/359, 446, 478, 486, 501, 502

(56) References Cited

U.S. PATENT DOCUMENTS

| | | | |
|---|---|---|---|
| 4,368,705 A | * 1/1983 | Stevenson et al. | ......... 123/357 |
| 4,428,341 A | 1/1984 | Hassler et al. | ............. 123/350 |
| 5,293,853 A | 3/1994 | Berger et al. | ............... 123/357 |
| 5,680,842 A | * 10/1997 | Schmid | ..................... 123/357 |

FOREIGN PATENT DOCUMENTS

| | | |
|---|---|---|
| DE | 3023350 | 1/1982 |
| DE | 4208002 | 9/1993 |

* cited by examiner

*Primary Examiner*—Tony M. Argenbright
(74) *Attorney, Agent, or Firm*—Crowell & Moring LLP

(57) ABSTRACT

For an internal combustion engine serving as a ship's propulsion unit or a generator drive, it is proposed, in operation within the range of the nominal output point, with the occurrence of a significant load change on the power take-off, to shift the injection start toward late. A significant load change on the power take-off is to be understood as the broaching of the ship's propulsion unit or the load rejection in generator operation. The shift of the injection start toward late provides the advantage that the speed control is additionally supported.

18 Claims, 6 Drawing Sheets

METHOD AND DEVICE FOR CONTROLLING AN INTERNAL COMBUSTION ENGINE

BACKGROUND AND SUMMARY OF INVENTION

This application claims the priority of German patent document 19937139.3, filed Aug. 6, 1999, the disclosure of which is expressly incorporated by reference herein.

The invention relates to a method and device for controlling an internal combustion engine in which an injection start is determined as a function of input variables.

Such a device is disclosed, for example, in German Patent Document DE 42 08 002 A1 (corresponding U.S. Pat. No. 5,293,853). In the system described therein, the start of injection is determined as a function of a fuel amount to be injected and an additional input variable, e.g., the engine speed. In an internal combustion engine used to drive a ship or a generator, the problem is that the load on the power take-off may be abruptly reduced, e.g., when the ship's propulsion unit broaches. These internal combustion engines, as is well known, are operated at the nominal output point. For the nominal output point, the manufacturer of the internal combustion engine guarantees the maximum engine output for continuous operation. Since the nominal output point varies as a function of fuel quality and the drive system used, the manufacturer additionally indicates the range within which the nominal output point can lie. A significant load change on the power take-off in terms of a load rejection causes a rapid increase in the engine speed. Due to the small speed difference between the engine speed value at the nominal output point and the maximum speed, the time span for speed control is too short to prevent the maximum speed from being exceeded. In this case speed control via the set-point injection amount is not an effective protection. As an enforcement measure, when the maximum speed is exceeded, the internal combustion engine is tripped and a diagnostic entry occurs.

Based on the described prior art and the technical problem presented, it is an object of the invention to ensure a safe operation of the internal combustion engine.

According to the invention, for an internal combustion engine operated in the range of the nominal output point, this object is attained in that a significant load change on the power take-off of the internal combustion engine is detected if the engine speed exceeds a first limit value. In terms of the invention a significant load change is to be understood as a load rejection. When the load change is detected, the start of injection is shifted toward late in terms of smaller crankshaft angle values before the top dead centers. For this purpose the characteristics map for the start of injection has a first and second area. The first area is defined via engine speed values that are less than the first limit value and the second area via engine speed values that are greater than the first limit value. In the second area, the characteristics map is designed in such a way that each value of the engine speed is associated with only one value of injection start.

As an alternative, a characteristics map switchover is provided, according to which, at the nominal output point, the start of injection is determined according to a first characteristics map, and upon detection of a significant load change, the start of injection is determined according to a second characteristics map. This second characteristics map is designed as described above.

This special embodiment of the characteristics map for the start of injection has the advantage that the speed control is additionally supported. This prevents the engine speed from reaching the critical maximum speed. Since no additional input variables are required to convert the characteristics map, it can be readily integrated in the existing program.

Other objects, advantages and novel features of the present invention will become apparent from the following detailed description of the invention when considered in conjunction with the accompanying drawings.

DETAILED DESCRIPTION OF THE DRAWINGS

Figure 1:
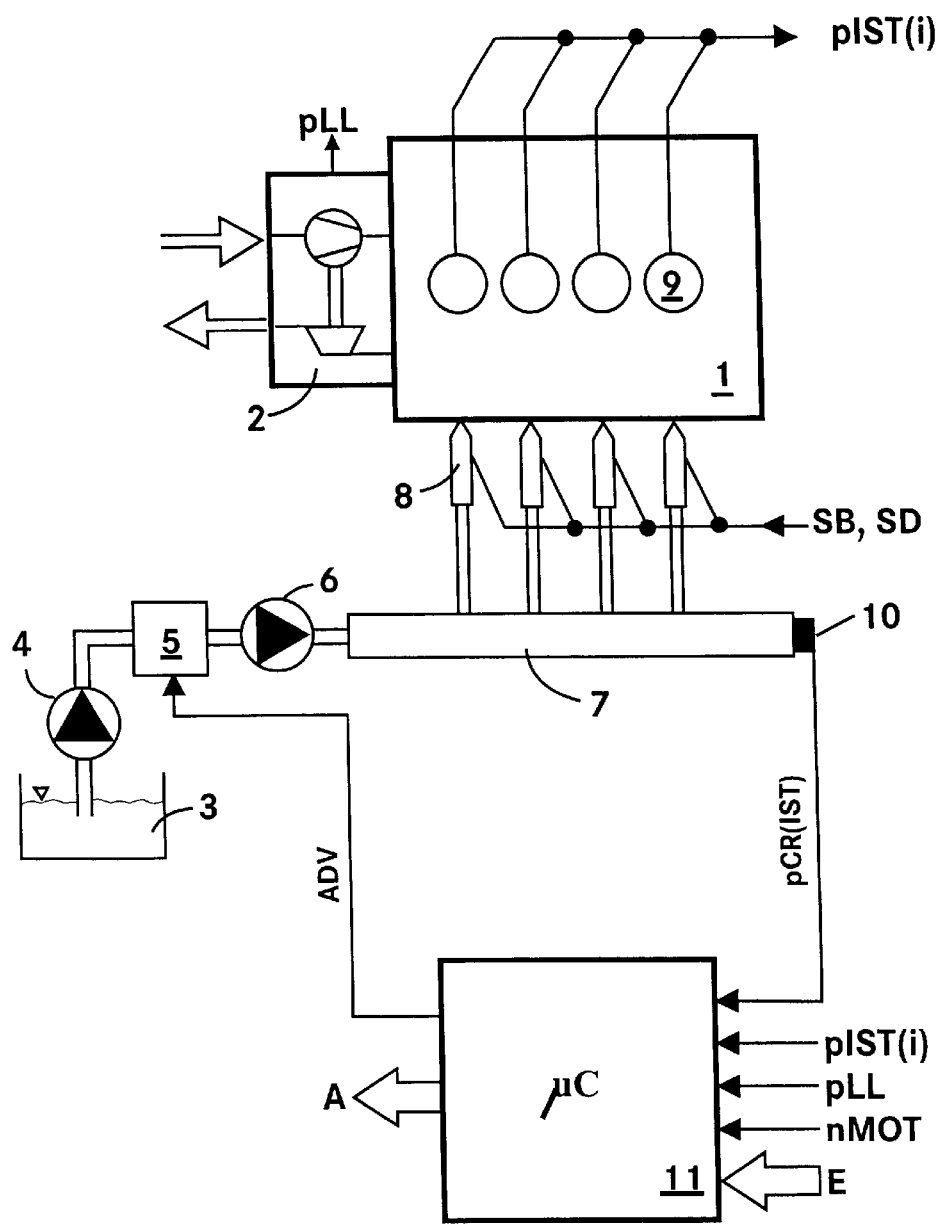
FIG. 1 is a system diagram for an engine and engine control system constructed according to preferred embodiments of the invention.

FIG. 1 depicts a block diagram of an internal combustion engine with accumulator injection system (common rail). This block diagram shows an internal combustion engine 1 with turbocharger and charge cooler 2, an electronic engine control device 11, a first pump 4, a second pump 6, a high-pressure accumulator (rail) 7, injectors 8 connected thereto, and a throttle valve 5. The first pump 4 pumps the fuel out of a fuel tank 3 through the throttle valve 5 to the second pump 6. The second pump 6, in turn, pumps the fuel under high pressure into the high-pressure accumulator 7. The pressure level of the high-pressure accumulator 7 is measured by means of a rail pressure sensor 10. From the high-pressure accumulator 7, lines with injectors 8 connected thereto branch off for each cylinder of the internal combustion engine 1.

The electronic engine control device 11 controls and regulates the state of the internal combustion engine 1. This device has the usual components of a microcomputer system, e.g., microprocessor, I/O components, buffers and memory modules (EEPROM, RAM). In the memory modules, the operating data relevant to the operation of the internal combustion engine 1 is applied to characteristics maps/curves. The input variables of the electronic engine control device 11 are: pressure of the cylinder space pIST(i), which is measured by pressure sensors 9, pressure pCR(IST) of the high-pressure accumulator 7, pressure level pLL of the turbocharger with charge cooler 2, and speed nMOT of the internal combustion engine 1. The other input variables relevant for the operation of the internal combustion engine 1 are represented by the reference symbol E. The output variables A of the electronic engine control device 11 are the control signals for the injectors 8, corresponding to the injection start SB and the injection duration SD, and the control signal ADV for the throttle valve 5 Via throttle valve 5 the inflow to the second pump 6 is adjusted.

Figure 2:
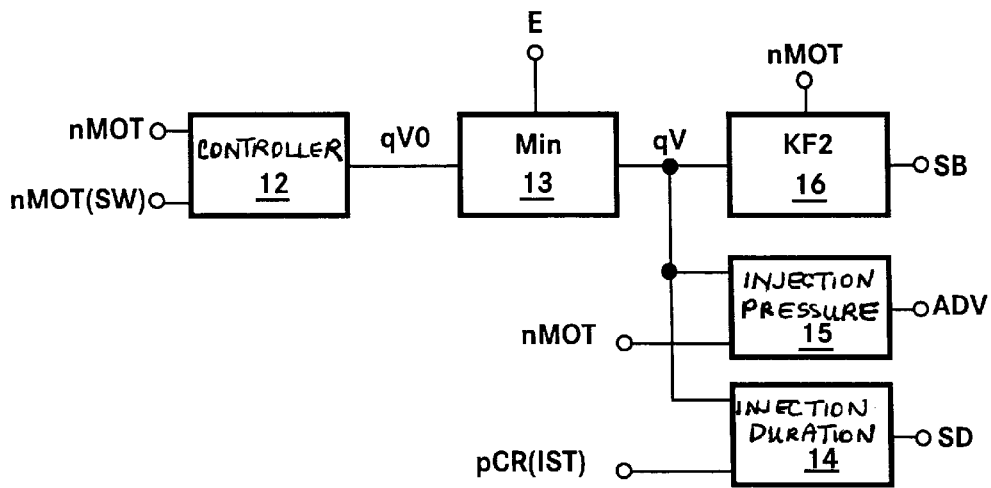
FIG. 2 is a block diagram schematically depicting a system for detecting injection start for the system of figure

FIG. 2 shows a block diagram to determine the injection start SB. The input variables are: the actual engine speed nMOT, the set-point engine speed nMOT(SW) and the pressure level pCR(IST) of the high-pressure accumulator 7. The output variables of the block diagram are the injection start SB, the injection pressure pCR(SW), and the injection duration SD. A controller 12, based on the control deviation corresponding to the set-point/actual value comparison of the engine speed, determines a set-point injection amount qV0. This amount is limited via a function block minimum value 13. For this purpose the function block 13 contains a characteristics map. The input variables E of the characteristics map are, e.g., the engine speed nMOT and the charge air pressure pLL. The output variable qV of the function block minimum value 13 is used as an input variable to a function block injection duration 14, a function block injection pressure 15, and a function block injection start 16. The function block injection duration 14 receives the pressure level pCR(IST) of the high-pressure accumulator 7 as a further input variable. The output variable of the function block injection duration 14 is the signal SD. The function block injection pressure 15 receives the engine speed nMOT as a further input variable. The output variable is the control signal ADV, the injection pressure, for the throttle valve 5. The function blocks 14 and 15 are not essential for the further understanding of the invention and will therefore not be described in detail. Injection start SB is determined via the function block injection start 16. The function block injection start 16 contains a characteristics map, hereinafter referred to as second characteristics map KF2. The second characteristics map will be explained in connection with FIG. 5.

Figure 3:
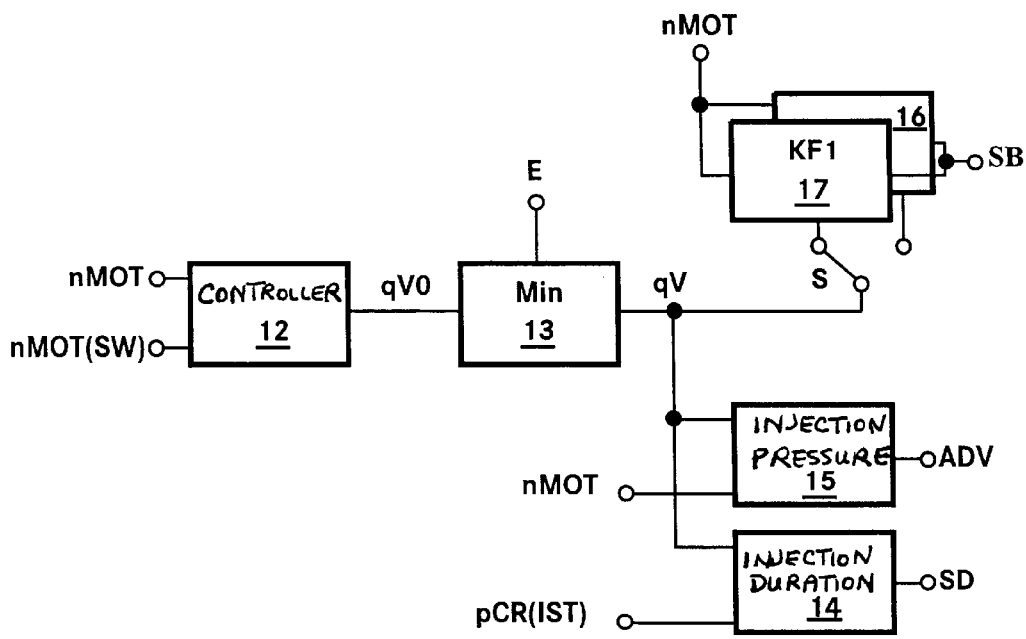
FIG. 3 is a block diagram schematically depicting a system, or detection start for the system of FIG. 1 construct according to an embodiment of the invention.

FIG. 3 shows a further block diagram to determine an injection start SB. It may be used as an alternative to the embodiment shown in FIG. 2. The block diagram according to FIG. 3 is distinguished from that shown in FIG. 2 by an additional function block injection start 17 and a changeover switch S. The function block injection start 17 contains a characteristics map, hereinafter referred to as first characteristics map KF1. The first characteristics map will be explained in connection with FIG. 4. In operation at the nominal output point, the injection start SB is calculated via the first characteristics map KF1. The software switch S is thus in the position shown. If the engine speed nMOT exceeds the first limit value GW1, this is interpreted as a significant load change. Upon detection of the load change, the software switch S changes to the other position so that the injection start SB is calculated by means of the second characteristics map KF2. What has been said under FIG. 2 applies to function blocks 12 to 15.

The examples shown in FIGS. 4 to 9 assume that the internal combustion engine 1 is operated within the range of the nominal output point and that the desired output selected, e.g., by means of a selector lever, remains constant during broaching and submersion.

Figure 4:
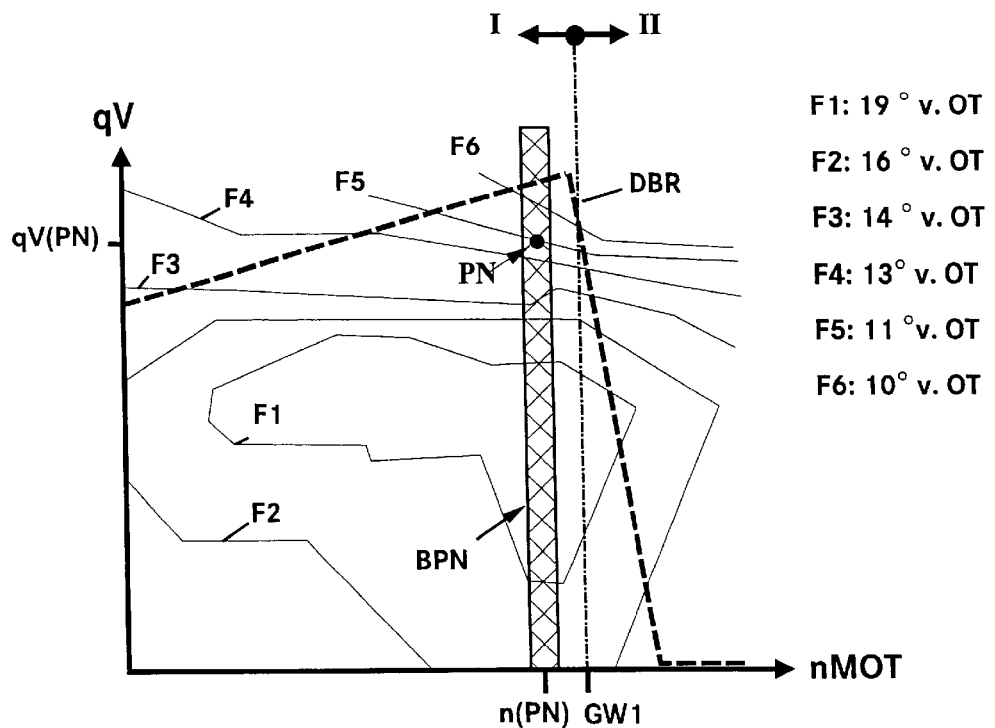
FIG. 4 is a first characteristics map for operation of the engine and engine control system.

FIG. 4 shows the first characteristics map KF1. Here, as input variables, the engine speed nMOT is plotted on the abscissa and the injection amount qV on the ordinate. The first characteristics map contains lines F1 to F6 of constant injection start SB. For example, line F1 defines an injection start of 19 degrees before the top dead center (TDC [OT]). The dashed line designates a speed limit curve DBR. The reference symbol BPN denotes a range. Within this range lies the nominal output point PN. In practice, this range is, for example, 100 revolutions. The nominal output point PN results from the abscissa value n(PN) and the ordinate value qV(PN). The position of the nominal output point PN results in an injection start SB according to line F5, i.e., 11 degrees before TDC.

For this nominal output point PN the manufacturer of the internal combustion engine guarantees the maximum engine output for continuous operation. As indicated by a dash dotted line in FIG. 4, the first characteristics map KF1 consists of a first area I and a second area II. The first area extends from the no-load speed up to the first limit value GW1. Engine speed values nMOT greater than the first limit value GW1 define the second area II. In practice, the lines F1 to F6 in the first area I are determined on the test stand. For the second area II these lines F1 to F6 are extrapolated since the internal combustion engine does not reach the second area II under stationary aspects.

If a significant load change occurs on the power takeoff of the internal combustion engine in operation within the range of the nominal output point PN, the engine speed nMOT rapidly increases. In ship operation, a significant load change on the power take-off occurs if the ship's propulsion unit broaches due to waves. In generator operation, this corresponds to load rejection. For a further explanation see FIG. 6, which shows a detail of the first characteristics map KF1. The engine speed nMOT develops from point PN toward A since the controller 12 is not capable of correcting the resulting deviation within such a short period of time. At point A the speed crosses the speed limit curve DBR. The crossing of the speed limit curve DBR, however, does not cause any immediate change in the course of the engine speed. The reason for this is that the engine speed signal nMOT used by the electronic engine control device 11 for the characteristics maps is filtered and time-delayed with respect to the detected signal. For filtering, for example a 2-revolution filter is used. The time delay results from the sampling control. At point B, the speed limit curve has an effect, so that the injection amount qV is set to the value of point C, qV(C). The injection amount qV(C) can be 0. The injection start at point A and B lies on line F6. The injection start SB of point C lies on line F2. The injection start SB thus changes from 10 degrees before TDC to 16 degrees before TDC, i.e., toward early. In other words: the output reduction through the reduction of the injection amount qV is countered by the injection start adjustment toward early.

Figure 5:
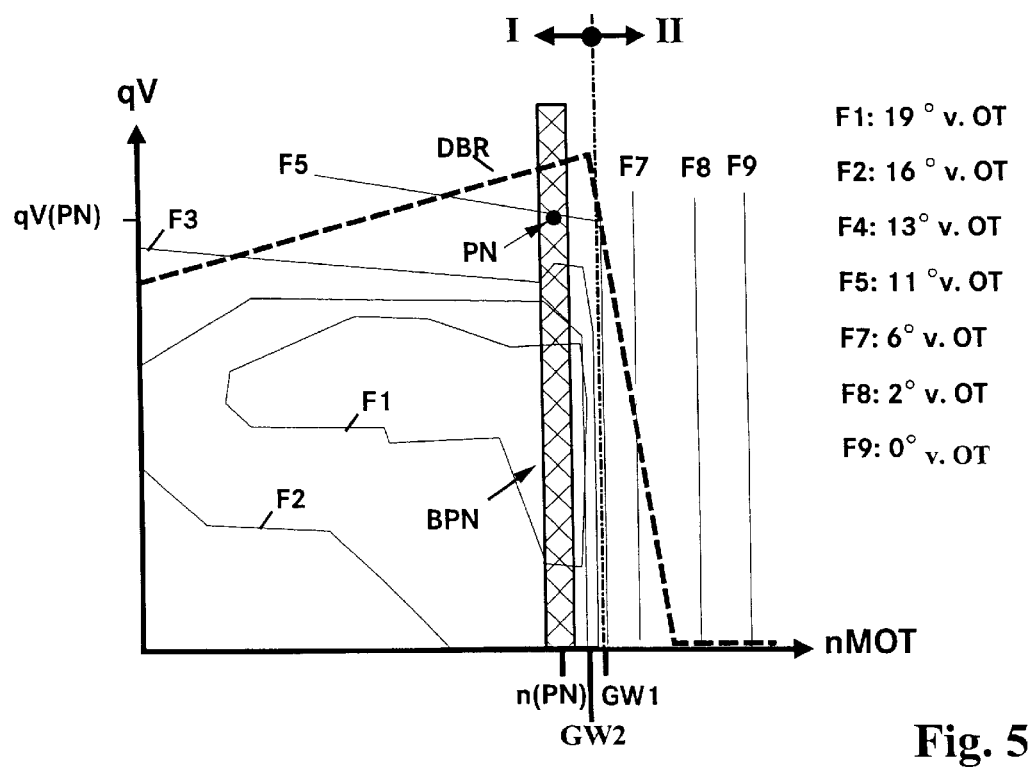
FIG. 5 is a second characteristics map for operation of the engine and engine control system.
Figure 6:
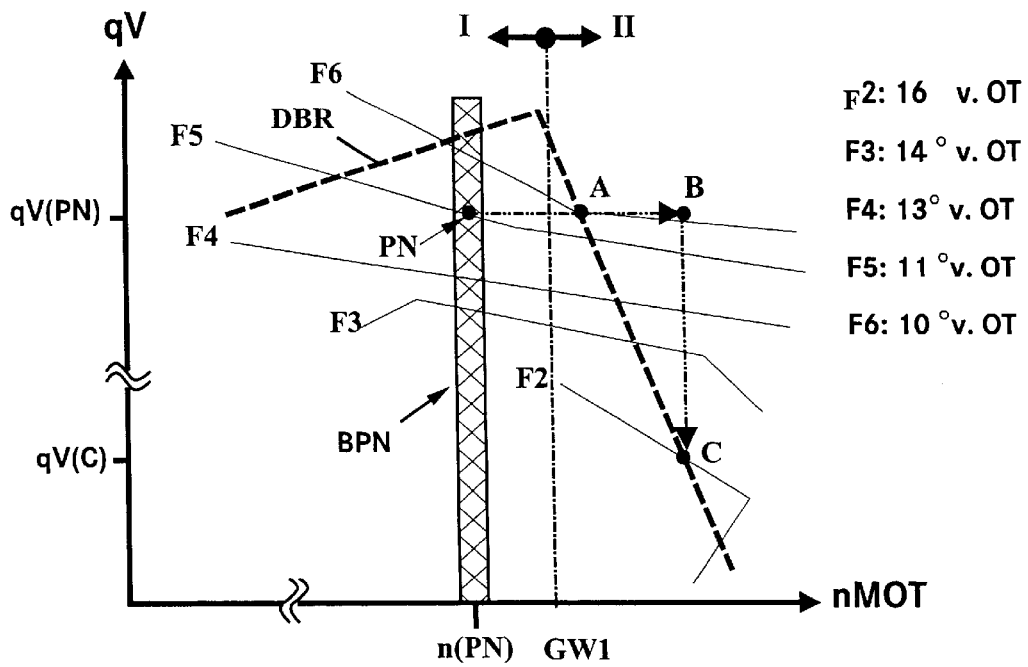
FIG. 6 is a detail of a first characteristics map for operation of the engine and engine control system.

FIG. 5 shows the second characteristics map KF2. Here, area I corresponds to area I of the first characteristics map. Area II contains lines of the same injection start F5, F7, F8 and F9, which are parallel to the ordinate. These lines can of course also run at an angle. For the above-described example of broaching or load rejection in generator operation see FIG. 7, which shows a detail of the second characteristics map KF2. In a load change, as described above, the engine speed nMOT moves along line PN, A, B, and C. In contrast to FIG. 6, however, point A has an-injection start value of 6 degrees before TDC and point C an injection start value of 2 degrees before TDC. The injection start values of the second characteristics map KF2 thus have lower values compared to the first characteristics map, i.e., the injection start is shifted toward late.

The embodiment of the second characteristics map thus provides the advantage that in a significant load change on the power take-off, speed control is additionally supported.

Figure 8A:
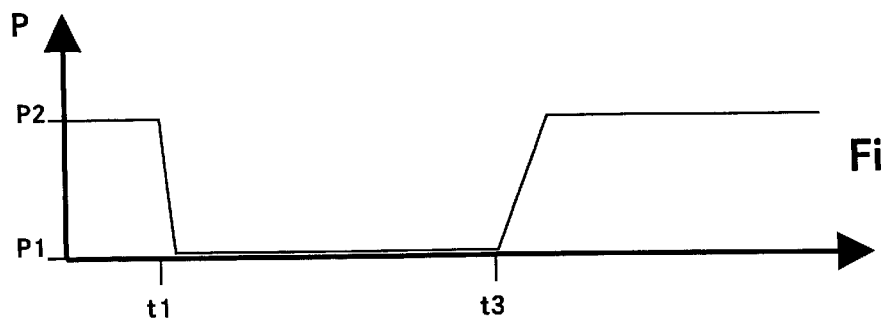
FIGS. 8A, 8B, and 8C are respective engine state diagrams over time of the systems according to the invention.
Figure 8B:
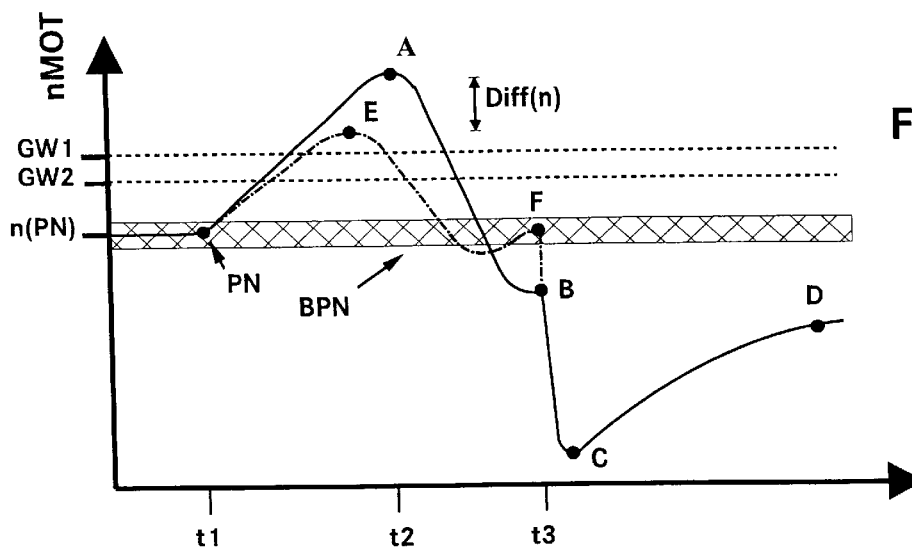
Figure 8C:
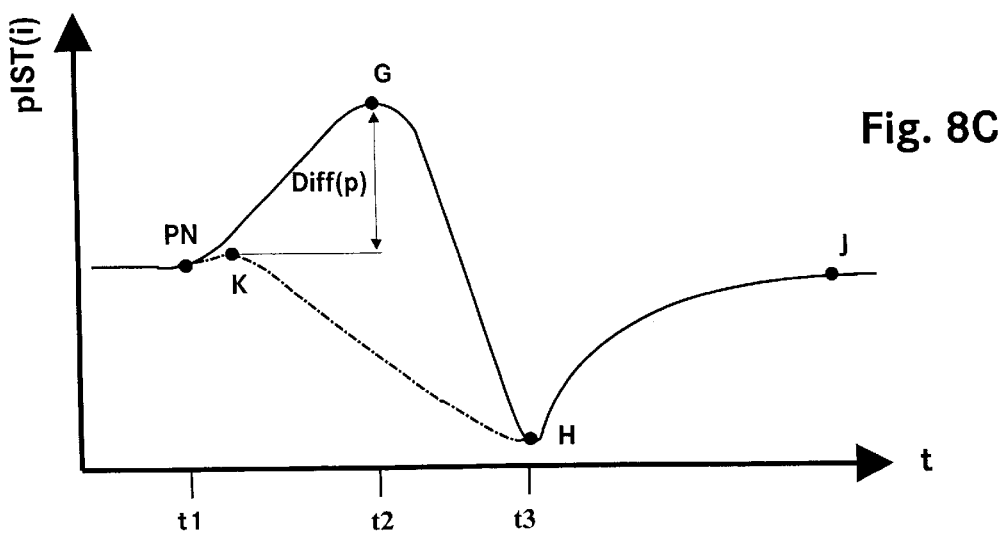

FIGS. 8A to 8C each shows a state diagram over time. FIG. 8A shows output P on the power take-off of the internal combustion engine, e.g., the output on the water jet drive. FIG. 8B shows the engine speed nMOT. FIG. 8C shows the cylinder internal pressure pIST(i). FIGS. 8B and 8C depict two examples of the case where there is a significant load change on the power take-off. The solid line shows a curve such as will result when the first characteristics map KF1 is used exclusively. The dash-dotted line shows a curve such as will result with the use of the second characteristics map KF2 or in case of a switchover from the first characteristics map KF1 to the second characteristics map KF2.

At instant t1, a load change occurs on the power takeoff. As a result output P changes from value P2 to value P1. Due to the load change, the engine speed nMOT starting from the nominal output point PN begins to increase in the direction of point A. At the same time, the cylinder internal pressure pIST(i) also increases from the nominal output point PN in the direction of point G. The load change is detected if the engine speed exceeds the first limit value GW 1 (nMOT>GW1). At instant t2 the engine speed nMOT reaches the value of point A. Based on the speed limit curve DBR the injection amount qV is set to 0. The injection amount and the internal engine friction cause the engine speed to change to smaller values in the direction of point B. The cylinder internal pressure changes analogously in the direction of point H. At instant t3, it is assumed that the ship's propulsion unit submerges again, i.e., the signal shape of FIG. 8A changes from P1 to P2. As a consequence, the engine speed nMOT is immediately reduced to the level of point C. After instant t3, the controller attempts to control to the engine speed value of the nominal output point PN, i.e., the engine speed changes in the direction of point D or the cylinder internal pressure in the direction of point J.

If, instead of the first characteristics map KF1 the second characteristics map KF2 is used, the engine speed nMOT as shown in FIG. 8B runs according to the line with points PN, E, and F. The cylinder internal pressure pIST(i) runs according to the line with points PN, K, and H. At point E the engine speed nMOT remains below the value of point A as shown in FIG. 8B. In practice, this difference Diff(n) is 50 to 100 revolutions. Resubmersion is detected when the engine speed falls below a second limit value GW2 (nMOT<GW2). At point F the engine speed nMOT again reaches the nominal output point PN. As shown in FIG. 8C, the cylinder internal pressure pIST(i) reaches its maximum value at point K. In practice, the difference Diff(p) between points G and K is approximately 15 bar.

In practice, the invention can be embodied in such a way that only the second characteristics map KF2 is used. Alternatively, the characteristics map switchover according to FIG. 3 may be used; i.e., at the nominal output point the start of injection is calculated according to the first characteristics map KF1, and in a significant load change, the start of injection is calculated according to the second characteristics map KF2. If the engine speed falls below the second limit value GW2, there is a switchover back to the first characteristics map KF1.

Figure 7:
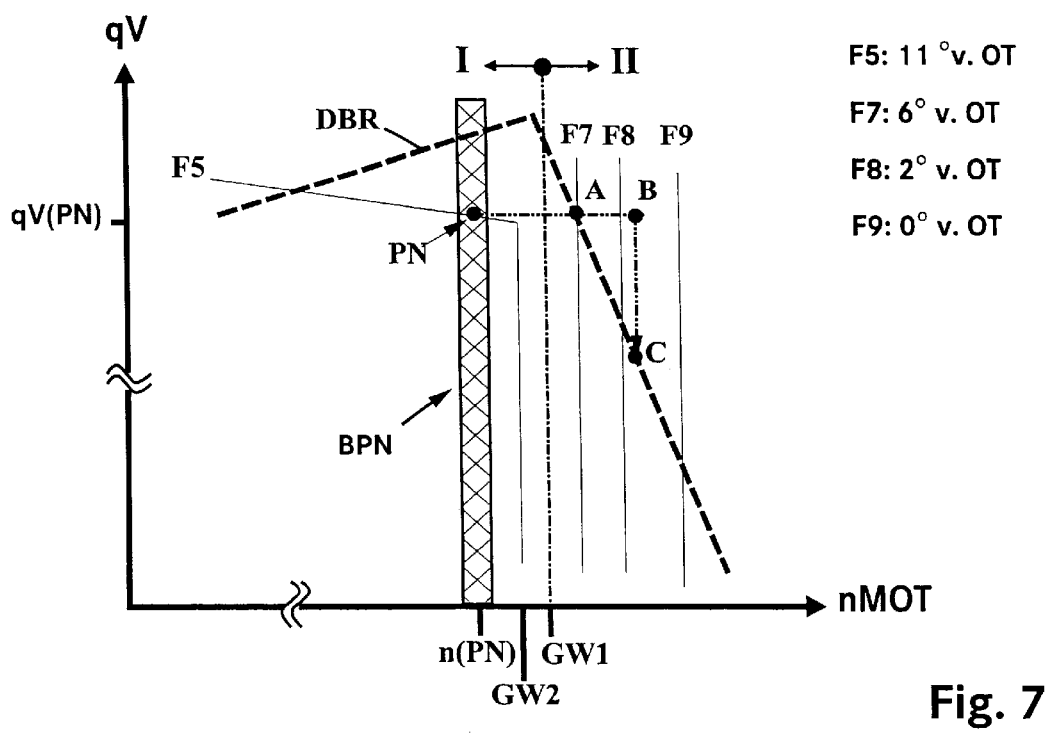
FIG. 7 is a detail of a second characteristics map for operation of the engine and engine control system.
Figure 9:
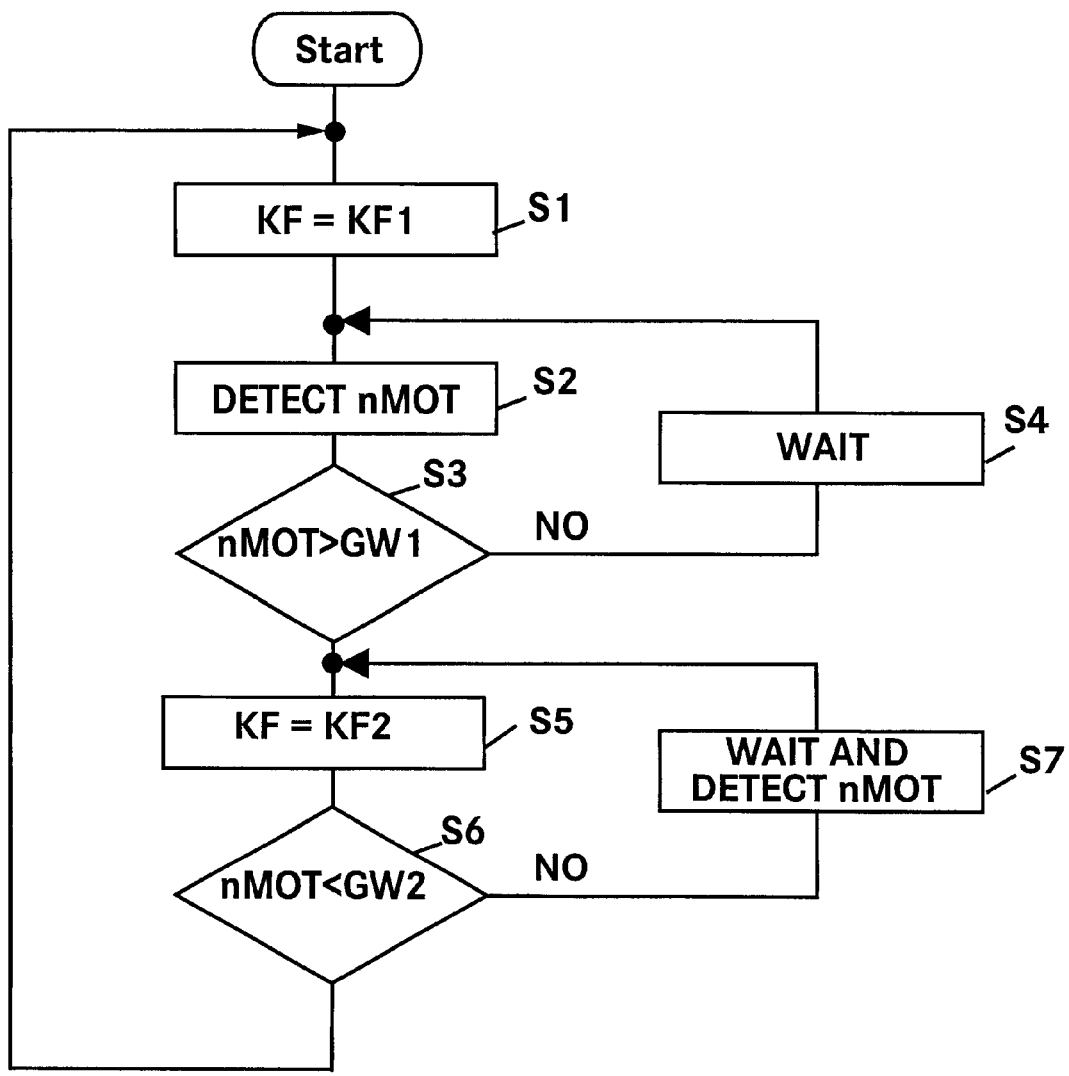
FIG. 9 is a program flowchart for the control system of the present invention.

FIG. 9 shows a program flowchart for the characteristics map switchover. The program cycle starts after initialization of the electronic engine control device 11. In step S1, the first characteristics map KF1 is set. In step S2, the engine speed nMOT is read in. In step S3, it is checked whether the ship's propulsion unit is broaching. This is detected if the engine speed nMOT exceeds the first limit value GW1. If the result is negative, a wait loop is executed in step S4. If the result in step S3 is positive, the second characteristics map KF2 is activated in step S5. The embodiment of the second characteristics map KF2, in the second area, results in a change in the injection start SB toward late. As shown in FIGS. 5 and 7, the injection start SB is thus merely a function of the engine speed nMOT. In step S6, it is checked whether submersion is present. Resubmersion is detected if the engine speed nMOT, after detected broaching, falls below the second limit value GW2. If this is not the case, a wait loop is executed in step S7, and a new value of engine speed nMOT is read in. If the result is positive, the program cycle starts anew at S1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

List of Reference Symbols 1 internal combustion engine
2 turbocharger
3 fuel tank
4 first pump
5 throttle valve
6 second pump
7 high-pressure accumulator (rail)
8 injector
9 pressure sensor cylinder
10 rail pressure sensor
11 electronic engine control device
12 controller
13 function block minimum value
14 function block injection duration
15 function block injection pressure
16 function block injection start (KF2)
17 function block injection start (KF1)

What is claimed is:

1. Method for controlling an internal combustion engine in which an injection start is determined as a function of engine speed and injection amount, comprising:
   detecting a significant load change on a power take-off of the internal combustion engine if the engine speed exceeds a first limit value during operation within a range of a nominal output point, and
   shifting the injection start toward late in terms of smaller crankshaft angle values before the top dead center upon detecting said significant load change.

2. Method as claimed in claim 1,
   wherein the injection start is determined by using a characteristics map, the characteristics map having a first area and a second area, engine speed values less than the first limit value defining the first area, and engine speed values greater than the first limit value defining the second area.

3. Method as claimed in claim 2,
   wherein the characteristics map in the second area is designed in such a way that each value of the engine speed is associated with only one value of the injection start.

4. Method as claimed in claim 1,
   wherein, at the nominal output point the injection start is determined according to a first characteristics map, with the detection of the significant load change there is a switchover to a second characteristics map and the injection start is determined according to the second characteristics map, wherein the second characteristics map is embodied in such a way that each value of the engine speed is associated with only one value of the injection start.

5. Method and device as claimed in claim 4, wherein resubmersion is detected when the engine speed becomes less than a limit value.

6. Method as claimed in claim 5, wherein with detection of the resubmersion, there is a switchover from the second characteristics map back to the first characteristics map.

7. Method as claimed in claim 1, wherein the engine is part of an assembly which is use experiences rapid engine load reductions.

8. Method as claimed in claim 1, wherein the engine is a ship engine for propelling a ship.

9. Method as claimed in claim 1, wherein the engine is a generator driving engine.

10. Apparatus for controlling an internal combustion engine in which an injection start is determined as a function of engine speed and injection amount, comprising;

a detector operable, in operation within a range of the nominal output point to detect a significant load change on a power take-off of the internal combustion engine if the engine speed exceeds a first limit value, and means responsive to the detection of the significant load change to shift the injection start toward later in terms of smaller crankshaft angle values before the top dead center.

11. Apparatus as claimed in claim 10, wherein the injection start is determined by using a characteristics map, the characteristics map having a first area and a second area, engine speed values less than the first limit value defining the first area, and engine speed values greater than the first limit value define the second area.

12. Apparatus as claimed in claim 11, wherein the characteristics map in the second area is designed in such a way that each value of the engine speed is associated with only one value of the injection start.

13. Apparatus as claimed in claim 10, wherein, at the nominal output point the injection start is determined according to a first characteristics map, with the detection of the significant load change there is a switchover to a second characteristics map and the injection start is determined according to the second characteristics map, wherein the second characteristics map is embodied in such a way that each value of the engine speed is associated with only one value of the injection start.

14. Apparatus as claimed in claim 13, wherein resubmersion is detected when the engine speed becomes less than a limit value.

15. Apparatus as claimed in claim 14, wherein with detection of the resubmersion, there is a switchover from the second characteristics map back to the first characteristics map.

16. Apparatus as claimed in claim 10, wherein the engine is part of an assembly which is use experiences rapid engine load reductions.

17. Apparatus as claimed in claim 10, wherein the engine is a ship engine for propelling a ship.

18. Apparatus as claimed in claim 10, wherein the engine is a generator driving engine.

* * * * *